US012758846B2

(12) United States Patent
Abdelmalek et al.

(10) Patent No.: US 12,758,846 B2
(45) **Date of Patent: *Oct. 13, 2026**

(54) ARTIFICIAL INTELLIGENCE ASSISTED LIVE SPORTS DATA QUALITY ASSURANCE

(71) Applicant: STATS LLC, Chicago, IL (US)

(72) Inventors: Fady Abdelmalek, Vienna (AT); Matjaz Ales, Maribor (SI); Karl Ferk, Graz (AT); Filip Glojnaric, Graz (AT); Hector Ruiz, Barcelona (ES); Christian Marko, Graz (AT); Caner Bas, Istanbul (TR); Claudio Bridi, Prague (CZ); Demetre Iobashvili, Graz (AT)

(73) Assignee: STATS LLC, Chicago, IL (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/916,234

(22) Filed: Oct. 15, 2024

(65) Prior Publication Data

US 2025/0032882 A1 Jan. 30, 2025

Related U.S. Application Data

(63) Continuation of application No. 17/934,013, filed on Sep. 21, 2022, now Pat. No. 12,145,046.

(Continued)

(51) Int. Cl.
*A63B 71/06* (2006.01)
*G06N 20/00* (2019.01)

(Continued)

(52) U.S. Cl.
CPC ............ *A63B 71/06* (2013.01); *G06N 20/00* (2019.01); *H04N 21/2187* (2013.01); *H04N 21/8133* (2013.01)

(58) Field of Classification Search
CPC .... A63B 71/06; G06N 20/00; H04N 21/2187; H04N 21/8133

(Continued)

(56) References Cited

U.S. PATENT DOCUMENTS 5,364,093 A * 11/1994 Huston .................. G01S 19/51 473/409
8,726,400 B1 * 5/2014 Granstrom ......... H04N 21/2187 713/176

(Continued)

OTHER PUBLICATIONS

PCT International Application No. PCT/US22/76777, International Search Report and Written Opinion of the International Searching Authority, dated Dec. 8, 2022, 15 pages.

*Primary Examiner* — Zhen Y Wu
(74) *Attorney, Agent, or Firm* — Bookoff McAndrews, PLLC

(57) ABSTRACT

A computing system receives live event data corresponding to a live game. The live event data includes events occurring within the live game. The computing system analyzes the live event data to identify a potential error in the live event data. The computing system generates a ticket corresponding to the potential error flagged in the live event data. The computing system assigns the ticket to a first quality assurance agent to resolve. The computing system receives an indication that the ticket has been reviewed by the first quality assurance agent. the computing system provides the reviewed event data to an end user.

20 Claims, 7 Drawing Sheets

Related U.S. Application Data

(60) Provisional application No. 63/246,525, filed on Sep. 21, 2021.

(51) Int. Cl.
*H04N 21/2187* (2011.01)
*H04N 21/81* (2011.01)

(58) Field of Classification Search
USPC .................................................... 340/323 R
See application file for complete search history.

(56) References Cited

U.S. PATENT DOCUMENTS

| | | | | |
|---|---|---|---|---|
| 10,205,970 | B2 * | 2/2019 | Krahnstoever | H04N 21/631 |
| 10,438,212 | B1 * | 10/2019 | Jilani | G06N 5/025 |
| 11,451,842 | B2 | 9/2022 | Gershey et al. | |
| 2009/0077243 | A1 | 3/2009 | Garg et al. | |
| 2010/0111286 | A1 | 5/2010 | Chishti | |
| 2015/0248917 | A1 * | 9/2015 | Chang | G11B 27/031 386/282 |
| 2017/0223415 | A1 * | 8/2017 | Jeon | H04N 21/6125 |
| 2017/0270419 | A1 * | 9/2017 | Sánchez Charles | G06N 7/01 |
| 2019/0121847 | A1 * | 4/2019 | Castañeda-Villagrán | G06F 40/18 |
| 2019/0205651 | A1 * | 7/2019 | Chang | G06V 20/42 |
| 2019/0347282 | A1 * | 11/2019 | Cai | G06N 5/022 |
| 2020/0074181 | A1 * | 3/2020 | Chang | H04N 21/8456 |
| 2020/0230501 | A1 * | 7/2020 | Schwartz | G06Q 50/34 |
| 2020/0273055 | A1 * | 8/2020 | Smith | G06Q 10/02 |
| 2021/0286780 | A1 * | 9/2021 | Harale | G06N 5/04 |
| 2021/0321163 | A1 * | 10/2021 | Ramos | H04N 21/4662 |
| 2021/0342644 | A1 * | 11/2021 | Skuin | G06V 10/774 |
| 2022/0086511 | A1 * | 3/2022 | Laakkonen | G07F 17/3225 |
| 2022/0174342 | A1 * | 6/2022 | Gershey | G06N 5/01 |
| 2022/0334571 | A1 * | 10/2022 | Thangavel | G06Q 10/06393 |
| 2025/0032882 | A1 * | 1/2025 | Abdelmalek | G06N 20/00 |

* cited by examiner

300

400

600

ARTIFICIAL INTELLIGENCE ASSISTED LIVE SPORTS DATA QUALITY ASSURANCE

CROSS-REFERENCE TO RELATED APPLICATIONS

This application is a continuation of, and claims the benefit of priority to, U.S. patent application Ser. No. 17/934,013, filed Sep. 21, 2022, which claims priority to U.S. Provisional Application Ser. No. 63/246,525, filed Sep. 21, 2021, which are hereby incorporated by reference in their entireties.

FIELD OF THE DISCLOSURE

The present disclosure generally relates to system and method for using artificial intelligence techniques to identify errors in live sports data and optimize the task assignment to humans in order to keep a balanced workload amongst the support agents

BACKGROUND

Increasingly, sports fans and data analysts have become entrenched in sports analytics. In some situations, sports fans and data analysts alike seek real-time or near real-time statistics related to an ongoing event. Additionally, sports teams are interested in receiving more granular analytics at a faster speed during the course of the game.

SUMMARY

In some embodiments, a method is disclosed herein. A computing system receives live event data corresponding to a live game. The live event data includes events occurring within the live game. The computing system analyzes the live event data to identify a potential error in the live event data. The computing system generates a ticket corresponding to the potential error flagged in the live event data. The computing system assigns the ticket to a first quality assurance agent to resolve. The assigning includes identifying attributes of the ticket, wherein the attributes indicate information associated with the potential error, generating, by a first artificial intelligence model optimized for the first quality assurance agent, a first grade for the ticket based on the attributes of the ticket, generating, by a second artificial intelligence model optimized for a second quality assurance agent, a second grade for the ticket based on the attributes of the ticket, and determining that the first grade associated with the first quality assurance agent exceeds the second grade associated with the second quality assurance agent. The computing system receives an indication that the ticket has been reviewed by the first quality assurance agent. the computing system provides the reviewed event data to an end user.

In some embodiments, a non-transitory computer readable medium is disclosed herein. The non-transitory computer readable medium includes one or more sequences of instructions, which, when executed by one or more processors, causes a computing system to perform operations. The operations include receiving, by the computing system, live event data corresponding to a live game. The live event data includes events occurring within the live game. The operations further include analyzing, by the computing system, the live event data to identify a potential error in the live event data. The operations further include generating, by the computing system, a ticket corresponding to the potential error flagged in the live event data. The operations further include assigning, by the computing system, the ticket to a first quality assurance agent to resolve. The assigning includes identifying attributes of the ticket, wherein the attributes indicate information associated with the potential error, generating, by a first artificial intelligence model optimized for the first quality assurance agent, a first grade for the ticket based on the attributes of the ticket, generating, by a second artificial intelligence model optimized for a second quality assurance agent, a second grade for the ticket based on the attributes of the ticket, and determining that the first grade associated with the first quality assurance agent exceeds the second grade associated with the second quality assurance agent. The operations further include receiving, by the computing system, an indication that the ticket has been reviewed by the first quality assurance agent. The operations further include providing, by the computing system, the reviewed event data to an end user.

In some embodiments, a system is disclosed herein. The system includes a processor and a memory. The memory has programming instructions stored thereon, which, when executed by the processor, causes the system to perform operations comprising. The operations include receiving live event data corresponding to a live game. The live event data includes events occurring within the live game. The operations further include analyzing the live event data to identify a potential error in the live event data. The operations further include generating a ticket corresponding to the potential error flagged in the live event data. The operations further include assigning the ticket to a first quality assurance agent to resolve. The assigning includes identifying attributes of the ticket, wherein the attributes indicate information associated with the potential error, generating, by a first artificial intelligence model optimized for the first quality assurance agent, a first grade for the ticket based on the attributes of the ticket, generating, by a second artificial intelligence model optimized for a second quality assurance agent, a second grade for the ticket based on the attributes of the ticket, and determining that the first grade associated with the first quality assurance agent exceeds the second grade associated with the second quality assurance agent. The operations further include receiving an indication that the ticket has been reviewed by the first quality assurance agent. The operations further include providing the reviewed event data to an end user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The collection of sports data from live games is a massive operational undertaking, both from a live collection and quality assurance perspective. For example, in a given year, nearly 160 million data points may be collected across 100,000 matches utilizing thousands of data collectors. This demand continues to increase as customers continually request that more granular data be collected without any reduction in latency, while at the same time improving the data collection accuracy. Although certain aspects of data collection have been automated through the advancement of computer vision technologies, the depth of data to be collected by humans has increased well beyond the capabilities of computer vision techniques.

Further, even though technology has evolved, as the number of matches and data points being collected increase, the current approaches of applying quality assurance techniques to live data has not changed. The current process for reviewing live game data is static and manual, with quality assurance agents assigned to a predefined set of matches and collectors. Quality assurance agents review the live game data manually using a set of tools to detect errors in the live game data. Additionally, quality assurance review has the tendency to occur well after the game or match takes place, often occurring anywhere between three and five days after the event. To provide real-time or near real-time quality assurance on live game data would require companies to massively scale the amount of quality assurance agents at their disposal.

One or more techniques disclosed herein improve upon conventional systems by providing an artificial intelligence powered solution for reviewing live game data. For example, the present system may utilize an artificial intelligence anomaly engine trained to flag errors or potential errors in the live game data in real-time or near real-time. The system may then intelligently assign these alerts, in real-time or near real-time, to the most suitable human quality assurance supporter based on that person's profile and expertise. In this manner, the present system is able to generate the most accurate data for end users in a timely fashion. Turnaround is reduced from three to five days to real-time or near real-time.

Figure 1:
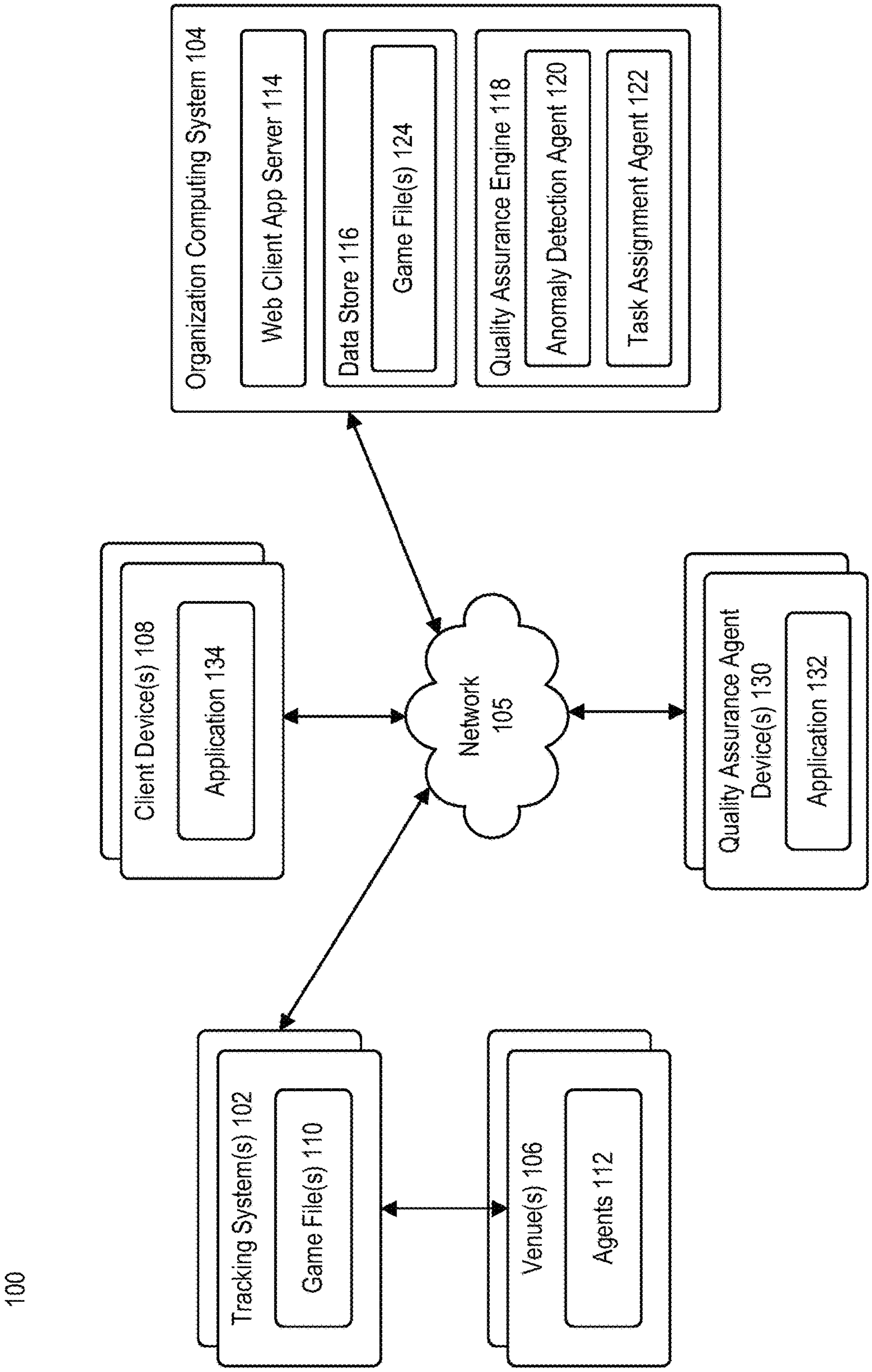
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, one or more client devices 108, and one or more quality assurance agent devices 130 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

In some embodiments, tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, tracking system 102 may be representative of human operators. For example, human operators in venue 106 or watching a broadcast of the game may generate event data corresponding to the game. Accordingly, game file 110 may further be augmented event data, such as, but not limited to, game event information (e.g., shots, goals, throw-ins, etc.) and context information (e.g., match state (e.g., safe, attack, danger), current score, time remaining, etc.).

Tracking system 102 may be configured to communicate with organization computing system 104 via network 105. In some embodiments, tracking system 102 may be configured to provide organization computing system 104 with tracking data and/or event data in real-time or near real-time. Organization computing system 104 may be configured to manage and analyze the data captured by tracking system 102. Organization computing system 104 may include at least a web client application server 114, data store 116, and quality assurance engine 118.

Data store 116 may be configured to store one or more game files 124. Each game file 124 may include tracking data, event data, and/or video data of a given match. In some embodiments, the video data may correspond to broadcast data of a given match, in which case, the video data may correspond to a plurality of video frames of the broadcast feed of a given match.

Quality assurance engine 118 may be configured to review event data and assign alerts for quality assurance agents to manually review. Quality assurance engine 118 may include anomaly detection agent 120 and task assignment agent 122.

Each of quality assurance engine, anomaly detection agent 120, and task assignment agent 122 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Anomaly detection agent 120 may be configured to review event data, in real-time or near real-time, as it is provided by tracking system 102. Anomaly detection agent 120 review the event data in real-time or near real-time to detect and flag any potential errors in the event data. Anomaly detection agent 120 may be configured to generate alerts from several algorithms and/or sources, such as, but not limited to, computer vision, pattern recognition, and/or direct customer queries. In some embodiments, anomaly detection agent 120 may utilize one or more pre-define rules, which consider the event flow. Upon breach of any of these rules, anomaly detection agent 120 may trigger or raise an alert. In some embodiments, the rules may be built around event flow information. For example, the rules may detect instances, such as, but not limited to, illogical sequences or short delays between different events, which may highlight a late input of a scout in a venue while the scout was collecting data.

Task assignment agent 122 may be configured to assign the alerts, generated by anomaly detection agent 120, to a quality assurance agent (e.g., Quality assurance agent device 130). For example, task assignment agent 122 may push alerts to the most suitable quality assurance based on one or more of the quality assurance agent's overall performance and their current workload. In this manner, task assignment agent 122 may remove the limitation of manually assigning the alert to an agent. Such assignment may be performed in real-time or near real-time, such that customers may be provided with correct data in real-time or near real-time instead of after the match. Task assignment agent 122 may include a trained artificial intelligence (AI) model, which may consider different features in different categories such as, but not limited to, one or more of alert features (e.g., severity, category, exp time to resolve), event features (e.g., sport, competition, importance), general QA supporter features (e.g., country, language, experience, historical performance), shift specific QA supporter features (e.g., time since started the shift, active time in shift, resolved tasks by severity, time since last break, time since last assignment, duration of last assignment), and the like. Based on the various features, the optimal QA supporter may be selected for an open task to optimize the resolution time while ensuring a higher quality output of the individual QA supporter. The model itself may be constantly retrained using a reinforcement learning approach to learn from the outcome of the processed tasks.

In some embodiments, AI model of assignment agent 122 may be trained to assign tasks to quality assurance agents based on each agent's respective historical data. For example, at the end of a given task, a quality assurance agent may be provided with a questionnaire that may prompt the quality assurance agent to grade or comment on the assigned task. In some embodiments, the questionnaire may ask the quality assurance agent one or more questions such as, but not limited to, one or more of how they liked the task, what they think is important to take into consideration when assigning the task, a grade for the task (e.g., difficulty level), and the like.

AI model of assignment agent 122 may be trained based on the historical tasks, a corresponding rating, and the corresponding quality assurance agent that worked on each historical task to generate a recommendation for assigning a future task. For example, assignment agent 122 may include a plurality of AI models, with each AI model of the plurality of AI models being trained for a specific quality assurance agent. During the training process, AI model may learn a set of weights that may be unique or associated with a given quality assurance agent.

In some embodiments, each AI model may be representative of a linear regression function. In some embodiments, the cost function being minimized may be:

$$\min_{\theta^1,\ldots,\theta^{n_u}} \frac{1}{2}\sum_{j=1}^{n_u} \sum_{i:r(i,j)=1} \left(\left(\theta^{(j)}\right)^T x^{(i)} - y^{(i,j)}\right)^2 + \frac{\lambda}{2}\sum_{j=1}^{n_u}\sum_{k=1}^{n}\left(\theta_k^{(j)}\right)^2$$

where r(i,j)=1 if supporter j has rated task i (0 if otherwise), y(i,j) represents the rating of the task i of the supporter j (if defined), $\theta^{(j)}$ represents the parameter vector (e.g., an array of numbers of length of features+1, which are the weights used while making a new prediction) for support j, $$\theta_k^{(j)}$$

represents the parameter of the $k^{th}$ position (k=number of features+1), parameter for the $k^{th}$ feature, λ represents the parameterization factor, and x(i) represents the feature vector for task i.

In some embodiments, the feature vector for a given task may include numerical and categorical features associated with the task. In some embodiments, the numerical features may include one or more of task priority, number of games currently covering, time in seconds since the last resolved task, last resolved task priority, average task priority resolved in current shift, average time to resolve the task in last X days (e.g., last 10 days), grouped by priority, and the like. In some embodiments, the categorical features may include one or more of task precision, sport, overtime, penalties, competition country, task category, coverage, time of the day, day of the week, country of the supporter, and the like.

In some embodiments, a gradient descent update may be used. For example, the gradient descent update may be:

$$\theta_k^{(j)} := \theta_k^{(j)} - \alpha \sum_{i:r(i,j)=1} \left(\left(\theta^{(j)}\right)^T x^{(i)} - y^{(i,j)} x_k^{(i)}\right) \text{ (for } k = 0\text{)}$$

-continued $$\theta_k^{(j)} := \theta_k^{(j)} - \alpha\left(\sum_{i:r(i,j)=1}\left((\theta^{(j)})^T x^{(i)} - y^{(i,j)}\right)x_k^{(i)} + \lambda\theta_k^{(j)}\right) \text{ (for } k \neq 0\text{)}$$

where α represents the learning rate.

During training, AI model goes through every task that a current quality assurance agent has graded to correlate the average time to resolve the task per supporter and overall and the average task rating per supporter and overall. For example, during training, AI model may go through every task that a current quality assurance agent has graded; AI model may adjust supporter weights based on minimizing the foregoing cost function, and may repeat the same process for every supporter. The final result may be a matrix of size n×m, where n may represent the number of supporters and m may represent the number of features+1. Based on this historical data, the weights of the quality assurance agent's personalized linear regression algorithm may be changed. Such process may be repeated for each quality assurance agent. Once the linear regression algorithms are tuned for each quality assurance agent, the linear regression algorithms may be deployed in assignment agent 122. For example, in operation, when a new task is identified, assignment agent 122 may provide the task as input to the plurality of linear regression modules. Each linear regression module may generate a predicted grade for the new task. Assignment agent 122 may assign the new task to the quality assurance agent whose algorithm generated the highest predicted grade.

In some embodiments, the AI models may be retrained once deployed. For example, the training data set for a given quality assurance agent may be supplemented with a plurality of new tickets that were graded by the first artificial intelligence model. Such combined data set may be used for further training the quality assurance agent's AI model.

Quality assurance engine 118 may be configured to generate a dashboard for each quality assurance agent. The dashboard may include the assigned tasks and the status of those assigned tasks. Via the dashboard, a quality assurance agent may be able to view each task, review the corresponding data, and perform one or more actions on the task. Exemplary actions may include, but is not limited to, releasing the task, escalating the task, and the like.

In some embodiments, quality assurance engine 118 may be configured to generate a dashboard for a quality assurance administrator. The administrator dashboard may allow a quality assurance administrator to have a bird's eye view of the operations. For example, a quality assurance administrator may view the number of raised alerts per priority and the average amount of time taken to address each alert or task. In some embodiments, the administrator dashboard may include an overview of the task action time (e.g., time between assignment and resolution) trend in the past hour, day, week, etc. In some embodiments, a quality assurance administrator may also be able to monitor the algorithms underlying anomaly detection agent 120 and task assignment agent 122. For example, a quality assurance administrator may monitor anomaly detection agent 120 and/or task assignment agent 122 to identify any potential decreases in accuracy (e.g., anomaly detection agent 120 generating too many false positives or task assignment agent 122 exhibiting bias in the distribution of tasks). In this manner, a quality assurance administrator can take swift action to adjust an algorithm underlying anomaly detection agent 120 and/or task assignment agent 122.

Quality assurance agent device(s) 130 may be in communication with organization computing system 104 via network 105. Quality assurance agent device 130 may be operated by a quality assurance agent associated with organization computing system 104. Quality assurance agent device 130 may be representative of a mobile device, a tablet, a desktop computer, or any computing system having the capabilities described herein.

Quality assurance agent device 130 may include at least application 132. Application 132 may be representative of a web browser that allows access to a website or a stand-alone application. Quality assurance agent device 130 may access application 132 to access one or more functionalities of organization computing system 104. Quality assurance agent device 130 may communicate over network 105 to request a webpage, for example, from web client application server 114 of organization computing system 104. For example, quality assurance agent device 130 may be configured to execute application 132 to their dashboard of alerts to be reviewed. Via application 132, a quality assurance agent able to review and tend to those alerts assigned to them. The content that is displayed to quality assurance agent device 130 may be transmitted from web client application server 114 to quality assurance agent device 130, and subsequently processed by application 132 for display through a graphical user interface (GUI) of quality assurance agent device 130.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, customers, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 134. Application 134 may be representative of a web browser that allows access to a website or a stand-alone application. Client device 108 may access application 134 to access one or more functionalities of organization computing system 104. Client device 108 may communicate over network 105 to request a webpage, for example, from web client application server 114 of organization computing system 104. For example, client device 108 may be configured to execute application 134 to access event data managed by organization computing system 104. The content that is displayed to client device 108 may be transmitted from web client application server 114 to client device 108, and subsequently processed by application 134 for display through a graphical user interface (GUI) of client device 108.

Figure 2:
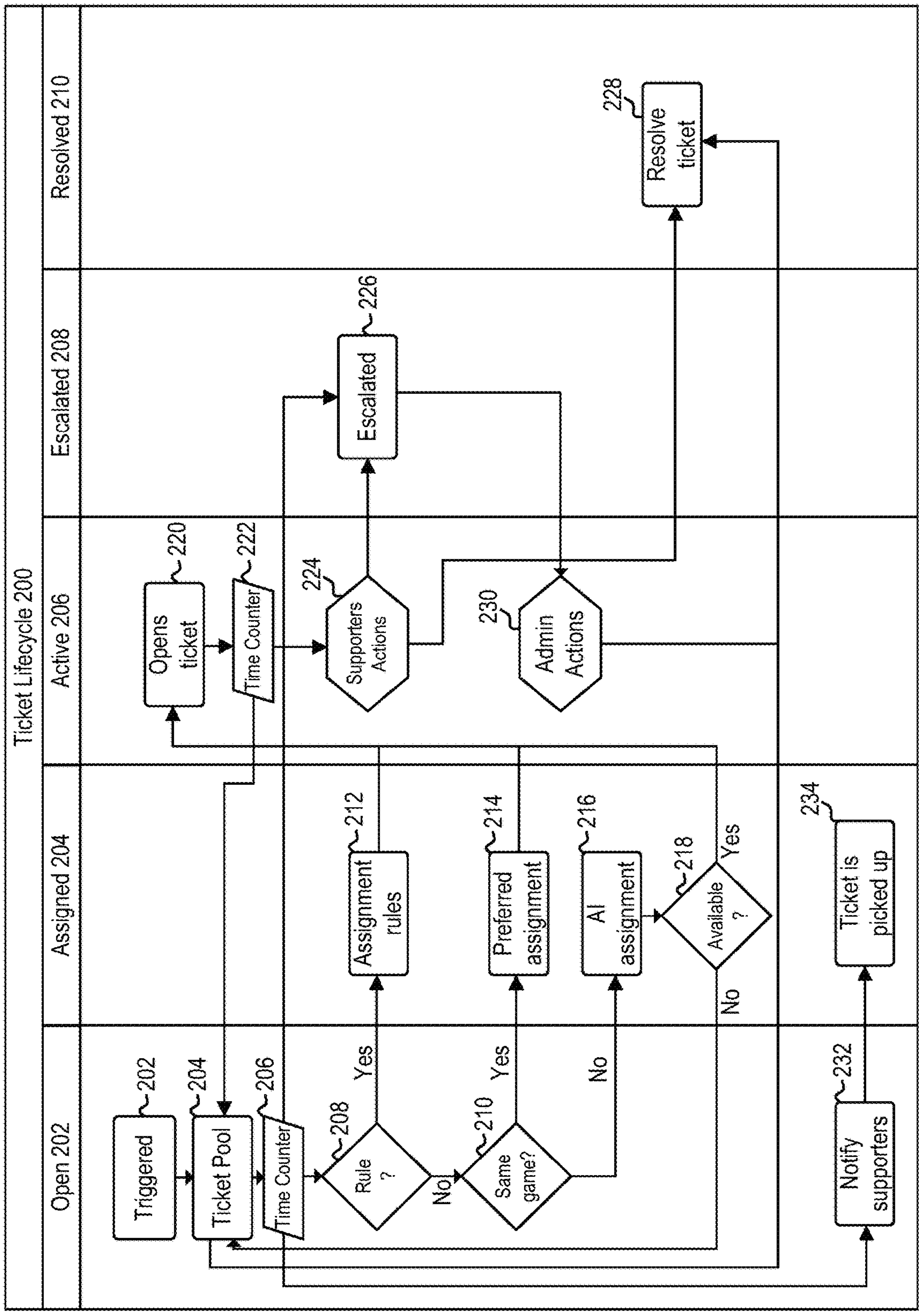
FIG. 2 is a flow diagram illustrating a ticket lifecycle, according to example embodiments.

FIG. 2 is a flow diagram illustrating a ticket lifecycle 200, according to example embodiments. Ticket lifecycle 200 may represent a lifecycle of a ticket or task from creation through completion.

At step 202, a ticket may be triggered. In some embodiments, the ticket may be triggered as a result of anomaly detection agent 120 reviewing event data in real-time or near real-time. For example, anomaly detection agent may review the event data to detect and flag any potential errors in the event data. In some embodiments, anomaly detection agent 120 may utilize a combination of several algorithms (e.g., computer vision, pattern recognition, etc.) to detect an anomaly. In some embodiments, anomaly detection agent 120 may utilize one or more pre-defined rules.

In some embodiments, the one or more pre-defined rules may include a card delayed rule (e.g., a "no card" was sent less than 15 seconds ago"). The card delayed rule may be triggered with a possible card command. Anomaly detection agent 120 may check the last 15 seconds of the game to determine whether there is a confirmation of a no card.

In some embodiments, the one or more pre-defined rules may include a disconnection rule (e.g., scout is disconnected). The disconnection rule may be a procedure based rule, which may be hardcoded. Anomaly detection agent 120 may check the connection status of a scout between scheduled kickoff-5 minutes until the end of the game.

In some embodiments, the one or more pre-defined rule may include a goal cancelled rule. The goal cancelled rule may be triggered with cancel goal command. In some embodiments, the goal cancelled rule may also resolve a goal scored ticket raised before.

At step 204, the ticket can be added to a ticket pool. For example, anomaly detection agent 120 may be configured to add the ticket to an event queue. The tickets in the event queue may be initially unassigned. Task assignment agent 122 may be configured to monitor the ticket pool to identify new tasks or tickets to be assigned to quality assurance agents.

In some embodiments, ticket lifecycle 200 may include step 206. At step 206, a timer may be initialized when a ticket is added to ticket pool. The timer may be used as a thresholding measure to determine when to escalate a ticket to an administrator. For example, if task assignment agent 122 determines that a ticket has been sitting in ticket pool for at least a threshold amount of time, task assignment agent may escalate the ticket to an administrator (e.g., "escalated 222"). If, however, the ticket has not been sitting in the ticket pool for at least a threshold amount of time (i.e., there is still time left on the time counter), then ticket lifecycle 200 may proceed to step 208.

At step 208, task assignment agent 122 may determine whether an assignment rule applies. In some embodiments, task assignment agent 122 may be configured to assign a task or ticket to a quality assurance agent based on predefined assignment rules. For example, an administrator may establish various assignment rules based on league, match, ticket type, or the like. Based on the league, match, or ticket type, task assignment agent 122 may be obligated to assign the ticket or task to a certain quality assurance agent or group of quality assurance agents. In other words, the one or more rules may have priority over the artificial intelligence generated determination for assigning the ticket. If, at step, 208, task assignment agent 122 determines that an assignment rule applies, then ticket lifecycle 200 may proceed to step 212. At step 212, task assignment agent 122 may assign the ticket in accordance with the assignment rules. If, however, at step 208, task assignment agent 122 determines that an assignment rule does not apply, then ticket lifecycle 200 may proceed to step 210.

At step 210, task assignment agent 122 may determine whether the ticket is for the same game as a previously assigned ticket. For example, task assignment agent 122 may attempt to assign the ticket to the same quality assurance agent or group of quality assurance agents assigned to at least one other ticket for the same game. If, at step 210, task assignment agent 122 determines that the ticket is for the same game as a previously assigned ticket, then ticket lifecycle 200 may proceed to step 214. At step 214, task assignment agent 122 may assign the ticket to a quality assurance agent that is handling a ticket or tickets for the same game or to a quality assurance agent from a group of quality assurance agents assigned to the same game. If, however, at step 210, task assignment agent 122 determines that the ticket is not for the same game as a previously assigned ticket, then ticket lifecycle 200 may proceed to step 216.

At step 216, task assignment agent 122 may assign the ticket to a quality assurance agent using artificial intelligence techniques. For example, task assignment agent 122 may input the ticket (or attributes of the ticket) into a plurality of linear regression algorithms. Each linear regression algorithm of the plurality of linear regression algorithms corresponds to a respective quality assurance agent of the plurality of quality assurance agents. Using the plurality of linear regression algorithms, task assignment agent 122 may generate a plurality of scores for the ticket. Each score of the plurality of scores may represent how a quality assurance agent may score or grade the ticket. Task assignment agent 122 may assign the ticket to the quality assurance agent whose algorithm graded or scored the ticket the highest.

At step 218, task assignment agent 122 may determine whether the artificial intelligence generated assignment is to a quality assurance agent that is available. If, at step 218, task assignment agent 122 determines that the quality assurance agent is unavailable, then ticket lifecycle 200 may revert to step 204, and task assignment agent 122 may send the ticket back to ticket pool for assignment to an available quality assurance agent. If, however, at step 218, task assignment agent 122 determines that the quality assurance agent is available, then ticket lifecycle 200 may proceed to step 220.

Once the ticket is assigned to a quality assurance agent, at step 220. At step 220, a quality assurance agent may open the assigned ticket using their quality assurance agent device 130. For example, quality assurance agent may launch application 132 executing on quality assurance agent device 130 to access and/or open the assigned ticket. At step 222, once quality assurance agent opens the assigned ticket, quality assurance engine 118 may initiate a timer. The timer may be used to motivate or prompt the quality assurance agent to resolve or escalate the ticket within a second threshold amount of time. In some embodiments, if quality assurance engine 118 determines that the quality assurance agent has not resolved or escalated the ticket within the second threshold amount of time, then ticket lifecycle 200 may revert to step 204. At step 204, quality assurance engine 118 may re-add the ticket to the ticket pool.

At step 224, quality assurance agent may perform an action on the ticket. In some embodiments, quality assurance agent may escalate the ticket to an admin. For example, a quality assurance agent may escalate the ticket to an admin if they are unsure of the proper action to take.

At step 226, the ticket may be added to an escalated ticket pool. Once the ticket is added to the escalated ticket pool, an administrator may access the ticket. For example, an administrator may open the escalated ticket using their quality assurance agent device 130. For example, administrator may launch application 132 executing on quality assurance agent device 130 to access and/or open the escalated ticket. At step 230, administrator may perform one or more actions to resolve the ticket. In some embodiment, the administrator may resolve the ticket. In some embodiments, the administrator may reassign the ticket. In some embodiments, the administrator may flag the ticket as false.

In some embodiments, at step 224, quality assurance agent may perform one or more actions to resolve the ticket. In some embodiment, the administrator may resolve the ticket. In some embodiments, the administrator may flag the ticket as false. In some embodiments, the quality assurance agent may escalate the ticket. Following step 224 or step 230, at step 228 the ticket may be resolved. In some embodiments, once the ticket is resolved, the status of the ticket changes to closed and the task may be marked as complete. In some embodiments, the quality assurance agent may be notified by a push notification or pop-up message that a new task is assigned. Once the quality assurance agent clicks on the task, the status of the task changes to open.

In some embodiments, such as when ticket lifecycle 200 may revert to step 204, anomaly detection agent 120 may notify quality assurance agents or supports that a ticket is available in the ticket pool at step 232. At step 234, a quality assurance agent that is available ma pick up the ticket.

Figure 3:
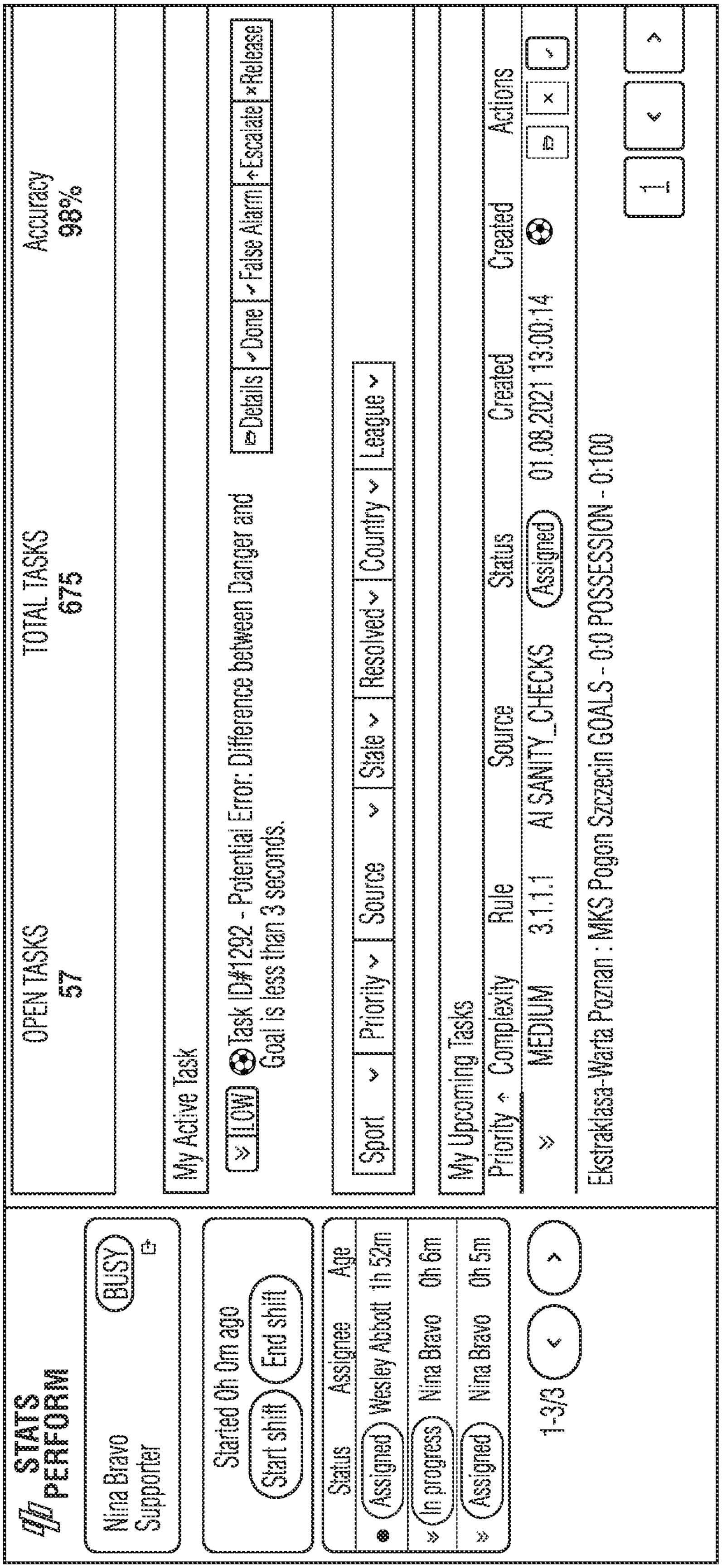
FIG. 3 illustrates an exemplary graphical user interface, according to example embodiments.

FIG. 3 illustrates an exemplary graphical user interface (GUI) 300, according to example embodiments. GUI 300 may correspond to a quality assurance dashboard generated by quality assurance engine 118. In some embodiments, GUI 300 may be displayed via application 132 executing on a quality assurance agent device 130.

As shown, GUI 300 may include a list of upcoming tickets for the quality assurance agent, as well as a status for each ticket. Via GUI 300, quality assurance agent may select a task, analyze the task, and provide feedback regarding the event data corresponding to the task. In some embodiments, the quality assurance agent may be presented with all the relevant information around this event so that they get the context of the situation within the sporting event. This may include information such as, but not limited to, one or more of alert type/reason/category, priority, current game state, previous events collected leading up to this event. The quality assurance agent may further be able to directly trigger the relevant support application to take action, such as correcting a data point, informing the customers about an ongoing investigation or reaching out to the data collector to confirm the scenario.

In some embodiments, such as when the quality assurance agent is an administrator, the quality assurance agent may be presented with a dashboard that allows for the monitoring of the one or more artificial intelligence models to ensure that the task assignment process of task assignment agent 122 works as expected. In some embodiments, quality assurance agent may have the option to manually intervene and push up particular tasks in the priority and assign them manually to another quality assurance agent if needed. In some embodiments, the statistics about the raised alerts may be presented to allow for manual validation if there are any peaks in alerts for a particular alert type, which may be due to false positives. This additional option may facilitate a manual intervention. For example, the reviewer/admin may tweak the alert generation model thresholds so that the QA supporter team is not kept artificially busy by dealing with false positives.

Figure 4:
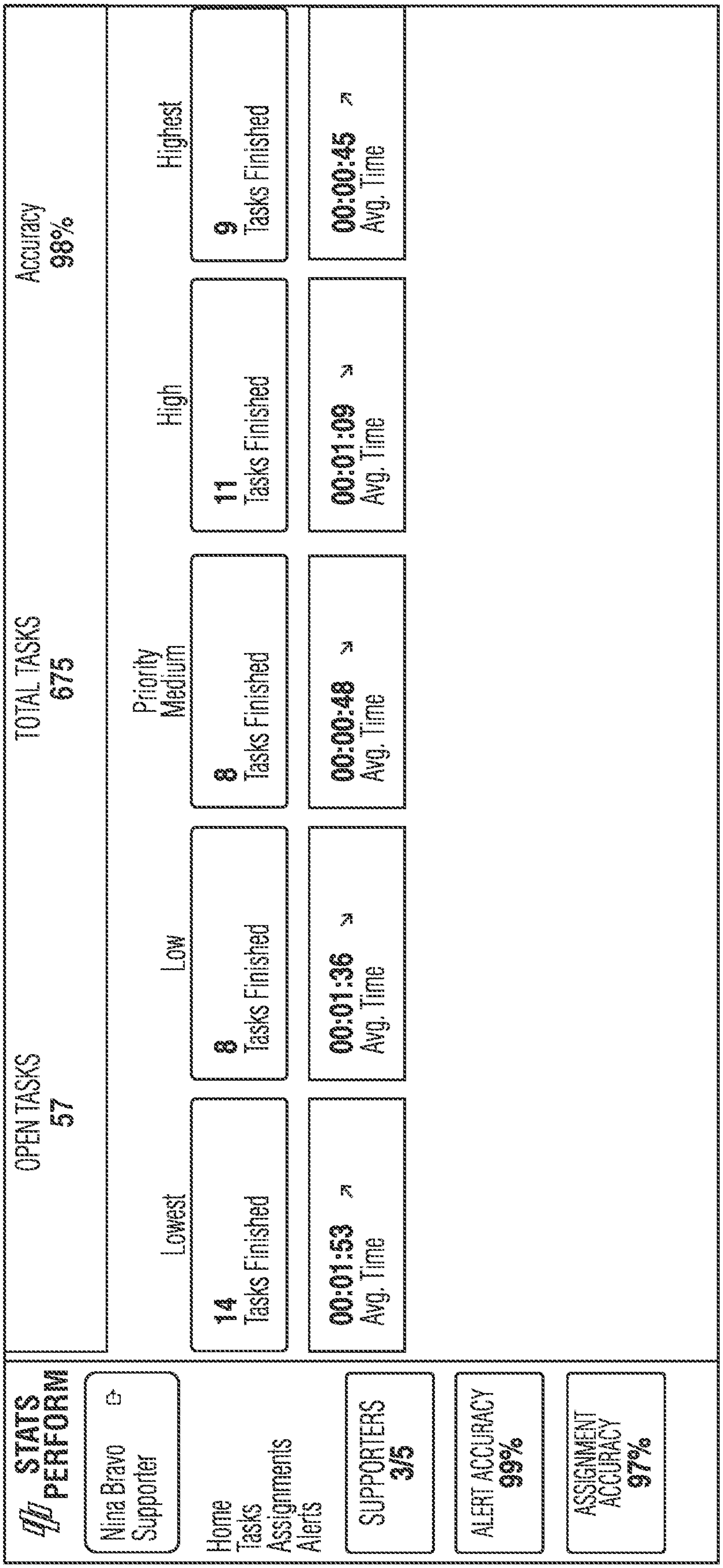
FIG. 4 illustrates an exemplary graphical user interface, according to example embodiments.

FIG. 4 illustrates an exemplary graphical user interface (GUI) 400, according to example embodiments. GUI 400 may correspond to an administrator dashboard generated by quality assurance engine 118. In some embodiments, GUI 400 may be displayed via application 132 executing on a quality assurance agent device 130.

As shown, GUI 400 may provide the quality assurance agent with various metrics regarding the quality assurance process. For example, via GUI 400, a quality assurance agent may view the number of tasks finished across a range of priority values (e.g., lowest to highest). In some embodiments, the quality assurance administrator may further view the average time it took a quality assurance agent to review each task.

Figure 5:
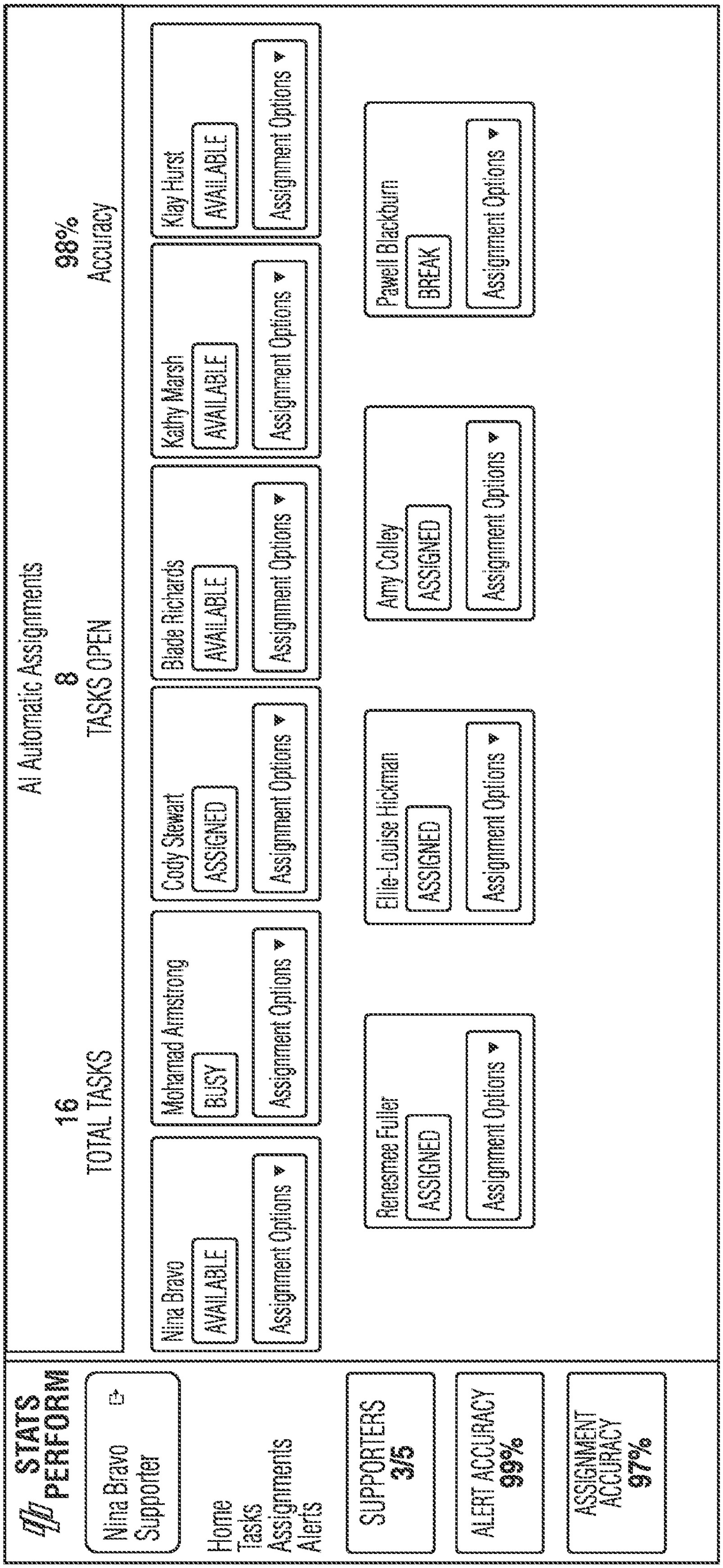
FIG. 5 illustrates an exemplary graphical user interface, according to example embodiments.

FIG. 5 illustrates an exemplary graphical user interface (GUI) 500, according to example embodiments. GUI 500 may correspond to an administrator dashboard generated by quality assurance engine 118. In some embodiments, GUI 500 may be displayed via application 132 executing on a quality assurance agent device 130.

As shown, GUI 500 may provide various metrics regarding the quality assurance process. For example, via GUI 500, a quality assurance administrator may view the availability of each quality assurance agent. Further, via GUI 500, quality assurance administrator may review anomaly detection agent 120 and/or task assignment agent 122 to spot any potential decreases in accuracy. For example, via administrator dashboard, an administrator may determine that anomaly detection agent 120 is generating too many false positives when analyzing the event data stream. In another example, via administrative dashboard, an administrator may determine that task assignment agent 122 is exhibiting bias in the assignment process.

Figure 6:
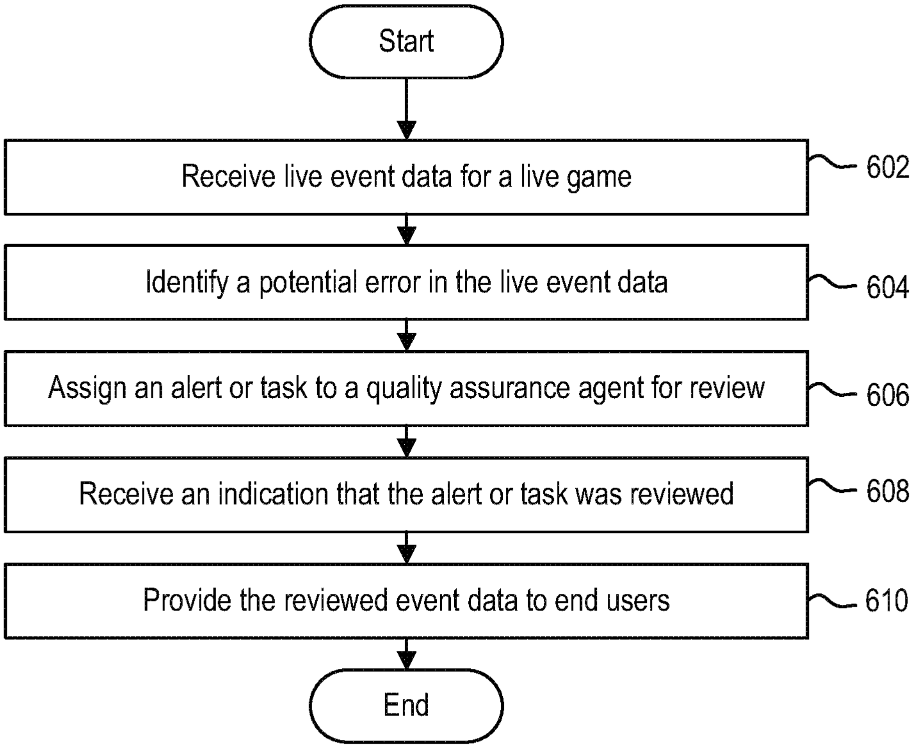
FIG. 6 is a flow diagram illustrating a method of reviewing event data for a live game, according to example embodiments, according to example embodiments.

FIG. 6 is a flow diagram illustrating a method 600 of reviewing event data for a live game, according to example embodiments. Method 600 may begin at step 602.

At step 602, organization computing system 104 may receive live event data from tracking system 102. In some embodiments, the live event data may include information regarding events occurring within a live game. Exemplary event data may include, but is not limited to, shot, goal, block, corner, free kick, throw-in, penalty, safe, attack, danger, and the like.

At step 604, organization computing system 104 may identify a potential error in the live event data. In some embodiments, anomaly detection agent 120 may utilize one or more artificial intelligence techniques to flag potential errors in the live event data. In some embodiments, anomaly detection agent 120 may utilize a rule based approach to flag potential errors in the live event data. Such analysis may be performed in real-time or near real-time. For each potential error, anomaly detection agent 120 may generate a ticket corresponding thereto.

At step 606, organization computing system 104 may assign the ticket to a quality assurance agent to resolve. In some embodiments, task assignment agent 122 may use one or more artificial intelligence techniques to assign the alert or task to a quality assurance agent. For example, task assignment agent 122 may input the ticket (or attributes of the ticket) into a plurality of linear regression algorithms. Each linear regression algorithm of the plurality of linear regression algorithms corresponds to a respective quality assurance agent of the plurality of quality assurance agents. Using the plurality of linear regression algorithms, task assignment agent 122 may generate a plurality of scores for the ticket. Each score of the plurality of scores may represent how a quality assurance agent may score or grade the ticket. Task assignment agent 122 may assign the ticket to the quality assurance agent whose algorithm graded or scored the ticket the highest.

At step 608, organization computing system 104 may receive an indication that the alert or task has been reviewed. For example, a quality assurance agent, via quality assurance agent device 130, may view their dashboard with the assigned alert or task. The quality assurance agent may review the alert or task and provide feedback related to whether the event data was correct (i.e., a false positive from anomaly detection agent 120) or whether the event data was incorrect (i.e., anomaly detection agent 120 correctly flagged the event data).

At step 610, organization computing system 104 may provide the reviewed event data to end users. In some embodiments, quality assurance engine 118 may provide the reviewed event data to an end user in real-time or near real-time.

Figure 7A:
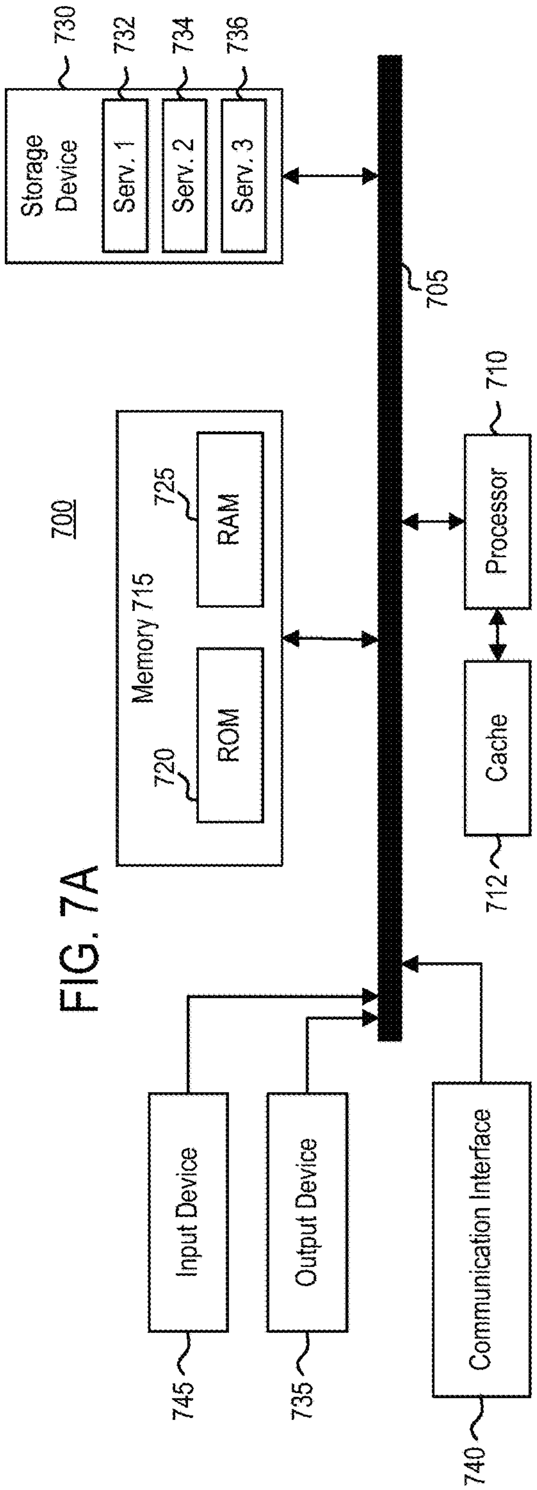
FIG. 7A is a block diagram illustrating a computing device, according to example embodiments.

FIG. 7A illustrates an architecture of computing system 700, according to example embodiments. System 700 may be representative of at least a portion of organization computing system 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system 700, an input device 745 may represent any number of input mechanisms, such as a microphone for speech, a touch-sensitive screen for gesture or graphical input, keyboard, mouse, motion input, speech and so forth. An output device 735 (e.g., display) may also be one or more of a number of output mechanisms known to those of skill in the art. In some instances, multimodal systems may enable a user to provide multiple types of input to communicate with computing system 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, output device 735, and so forth, to carry out the function.

Figure 7B:
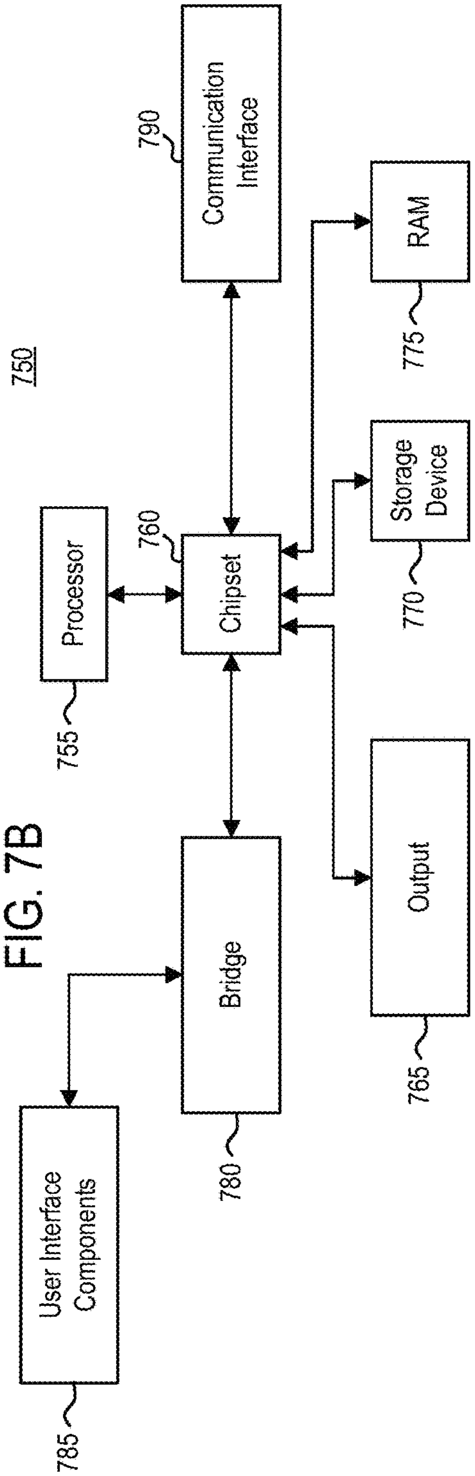
FIG. 7B is a block diagram illustrating a computing device, according to example embodiments.

FIG. 7B illustrates a computer system 750 having a chipset architecture that may represent at least a portion of organization computing system 104. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage device 770, which may include magnetic media, and solid-state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage device 770 or RAM 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A computer-implemented method comprising:
receiving, by a computing system, event data corresponding to a game, the event data including one or more events occurring within the game;
utilizing, by the computing system, an artificial intelligence anomaly engine to analyze the event data and flag a potential error in the event data;
generating, by the computing system, a ticket corresponding to the potential error flagged in the event data;
determining, by the computing system, that the ticket corresponds to a game that does not have any other tickets pending;
in response to the determining, assigning, by the computing system, the ticket to a first quality assurance agent to resolve;
receiving, by the computing system, an indication that the ticket has been reviewed by the first quality assurance agent; and
providing, by the computing system, reviewed event data to an end user based on receiving the indication, wherein the reviewed event data is a version of the event data.

2. The computer-implemented method of claim 1, wherein assigning, by the computing system, the ticket to the first quality assurance agent to resolve, further comprises:
identifying, by the computing system, one or more attributes of the ticket, wherein the one or more attributes indicate information associated with the potential error;
generating, by a first artificial intelligence model of the computing system, a first grade for the ticket based on the one or more attributes of the ticket;
generating, by a second artificial intelligence model of the computing system, a second grade for the ticket based on the one or more attributes of the ticket; and
determining, by the computing system, that the first grade associated with the first quality assurance agent exceeds the second grade associated with a second quality assurance agent.

3. The computer-implemented method of claim 2, the computer-implemented method further comprising:
generating, by the computing system, the first artificial intelligence model by:
identifying, by the computing system, a plurality of historical tickets resolved by the first quality assurance agent;
for each historical ticket of the plurality of historical tickets, identifying, by the computing system, one or more historical attributes of the ticket and a historical grade assigned to the historical ticket by the first quality assurance agent; and
learning, by the first artificial intelligence model, to grade one or more future tickets by correlating the one or more historical attributes of the plurality of historical tickets with historical grades assigned to the plurality of historical tickets.

4. The computer-implemented method of claim 3, the computer-implemented method further comprising:
retraining, by the computing system, the first artificial intelligence model by supplementing the plurality of historical tickets graded by the first quality assurance agent with a plurality of new tickets that were graded by the first artificial intelligence model.

5. The computer-implemented method of claim 2, the computer-implemented method further comprising:
generating, by the computing system, the second artificial intelligence model by:
identifying a second plurality of historical tickets resolved by the second quality assurance agent;
for each second historical ticket of the second plurality of historical tickets, identifying second historical attributes of the second historical ticket and a second historical grade assigned to the second historical ticket by the second quality assurance agent; and
learning, by the second artificial intelligence model, to grade one or more future tickets by correlating the second historical attributes of the second plurality of historical tickets with second historical grades assigned to the second plurality of historical tickets.

6. The computer-implemented method of claim 1, wherein providing, by the computing system, the reviewed event data to the end user based on receiving the indication, wherein the reviewed event data is the version of the event data comprises:
providing, by the computing system, the reviewed event data to one or more downstream prediction models to generate one or more artificial intelligence insights associated with the game.

7. The computer-implemented method of claim 1, the computer-implemented method further comprising:
generating, by the computing system, a dashboard for the first quality assurance agent, wherein the dashboard indicates a number of pending tickets, a number of completed tickets, and one or more metrics associated with the completed tickets.

8. The computer-implemented method of claim 2, the computer-implemented method further comprising:
based on the determining, generating, by the computing system, an alert indicating that the first grade associated with the first quality assurance agent fails to exceed the second grade associated with the second quality assurance agent; and
based on the generating, transmitting, by the computing system, the alert to an electrical device.

9. A non-transitory computer readable medium comprising one or more sequences of instructions, which, when executed by one or more processors, causes a computing system to perform operations comprising:
receiving, by the computing system, event data corresponding to a game, the event data including one or more events occurring within the game;
utilizing, by the computing system, an artificial intelligence anomaly engine to analyze the event data and flag a potential error in the event data;
generating, by the computing system, a ticket corresponding to the potential error flagged in the event data;
determining, by the computing system, that the ticket corresponds to a game that does not have any other tickets pending;
in response to the determining, assigning, by the computing system, the ticket to a first quality assurance agent to resolve;

receiving, by the computing system, an indication that the ticket has been reviewed by the first quality assurance agent; and providing, by the computing system, reviewed event data to an end user based on receiving the indication, wherein the reviewed event data is a version of the event data.

10. The non-transitory computer readable medium of claim 9, wherein assigning, by the computing system, the ticket to the first quality assurance agent to resolve, comprises:

identifying, by the computing system, one or more attributes of the ticket, wherein the one or more attributes indicate information associated with the potential error;

generating, by a first artificial intelligence model of the computing system, a first grade for the ticket based on the one or more attributes of the ticket;

generating, by a second artificial intelligence model of the computing system, a second grade for the ticket based on the one or more attributes of the ticket; and determining, by the computing system, that the first grade associated with the first quality assurance agent exceeds the second grade associated with a second quality assurance agent.

11. The non-transitory computer readable medium of claim 10, further comprising:

generating, by the computing system, the first artificial intelligence model by:

identifying, by the computing system, a plurality of historical tickets resolved by the first quality assurance agent;

for each historical ticket of the plurality of historical tickets, identifying, by the computing system, one or more historical attributes of the ticket and a historical grade assigned to the historical ticket by the first quality assurance agent; and learning, by the first artificial intelligence model, to grade one or more future tickets by correlating the one or more historical attributes of the plurality of historical tickets with historical grades assigned to the plurality of historical tickets.

12. The non-transitory computer readable medium of claim 11, further comprising:

retraining, by the computing system, the first artificial intelligence model by supplementing the plurality of historical tickets graded by the first quality assurance agent with a plurality of new tickets that were graded by the first artificial intelligence model.

13. The non-transitory computer readable medium of claim 10, further comprising:

generating, by the computing system, the second artificial intelligence model by:

identifying a second plurality of historical tickets resolved by the second quality assurance agent;

for each second historical ticket of the second plurality of historical tickets, identifying second historical attributes of the second historical ticket and a second historical grade assigned to the second historical ticket by the second quality assurance agent; and learning, by the second artificial intelligence model, to grade one or more future tickets by correlating the second historical attributes of the second plurality of historical tickets with second historical grades assigned to the second plurality of historical tickets.

14. The non-transitory computer readable medium of claim 10, wherein providing, by the computing system, the reviewed event data to the end user based on receiving the indication, wherein the reviewed event data is the version of the event data comprises:

providing, by the computing system, the reviewed event data to one or more downstream prediction models to generate one or more artificial intelligence insights associated with the game.

15. The non-transitory computer readable medium of claim 10, further comprising:

generating, by the computing system, a dashboard for the first quality assurance agent, wherein the dashboard indicates a number of pending tickets, a number of completed tickets, and one or more metrics associated with the completed tickets.

16. The non-transitory computer readable medium of claim 10, further comprising:

based on the determining, generating, by the computing system, an alert indicating that the first grade associated with the first quality assurance agent fails to exceed the second grade associated with the second quality assurance agent; and based on the generating, transmitting, by the computing system, the alert to an electrical device.

17. A computer system, comprising:

a processor; and a memory having programming instructions stored thereon, which, when executed by the processor, causes the system to perform operations comprising:

receiving event data corresponding to a game, the event data including one or more events occurring within the game;

utilizing an artificial intelligence anomaly engine to analyze the event data and flag a potential error in the event data;

generating a ticket corresponding to the potential error flagged in the event data;

determining that the ticket corresponds to a game that does not have any other tickets pending;

in response to the determining, assigning the ticket to a first quality assurance agent to resolve;

receiving an indication that the ticket has been reviewed by the first quality assurance agent; and providing reviewed event data to an end user based on receiving the indication, wherein the reviewed event data is a version of the event data.

18. The computer system of claim 17, wherein assigning the ticket to the first quality assurance agent to resolve, further comprises:

identifying one or more attributes of the ticket, wherein the one or more attributes indicate information associated with the potential error;

generating, by a first artificial intelligence model, a first grade for the ticket based on the one or more attributes of the ticket;

generating, by a second artificial intelligence model, a second grade for the ticket based on the one or more attributes of the ticket; and determining that the first grade associated with the first quality assurance agent exceeds the second grade associated with a second quality assurance agent.

19. The computer system of claim 18, wherein the programming instructions causes the system to perform further operations comprising:

based on the determining, generating an alert indicating that the first grade associated with the first quality assurance agent fails to exceed the second grade associated with the second quality assurance agent; and based on the generating, transmitting the alert to an electrical device.

20. The computer system of claim 17, wherein the operations further comprise:

generating a dashboard for the first quality assurance agent, wherein the dashboard indicates a number of pending tickets, a number of completed tickets, and one or more metrics associated with the completed tickets.

* * * * *